(12) United States Patent
Okuno et al.

(10) Patent No.: US 9,972,446 B2
(45) Date of Patent: May 15, 2018

(54) ELECTRODE FOR POWER STORAGE DEVICE, POWER STORAGE DEVICE, AND METHOD FOR MANUFACTURING ELECTRODE FOR POWER STORAGE DEVICE

(71) Applicants: SUMITOMO ELECTRIC INDUSTRIES, LTD., Osaka-shi, Osaka (JP); MEIDENSHA CORPORATION, Tokyo (JP)

(72) Inventors: Kazuki Okuno, Itami (JP); Masatoshi Majima, Itami (JP); Takayuki Noguchi, Tokyo (JP); Daisuke Iida, Tokyo (JP); Masamichi Kuramoto, Tokyo (JP); Masashi Ishikawa, Osaka (JP); Maki Hattori, Osaka (JP); Takumi Inui, Osaka (JP)

(73) Assignee: Meidensha Corporation, Tokyo (JP)

( * ) Notice: Subject to any disclaimer, the term of this patent is extended or adjusted under 35 U.S.C. 154(b) by 234 days.

(21) Appl. No.: 14/890,185

(22) PCT Filed: May 13, 2014

(86) PCT No.: PCT/JP2014/062732
§ 371 (c)(1),
(2) Date: Nov. 10, 2015

(87) PCT Pub. No.: WO2014/185418
PCT Pub. Date: Nov. 20, 2014

(65) Prior Publication Data
US 2016/0118198 A1    Apr. 28, 2016

(30) Foreign Application Priority Data
May 15, 2013    (JP) .................... 2013-103053

(51) Int. Cl.
*H01G 9/00*     (2006.01)
*H01G 11/24*    (2013.01)
(Continued)

(52) U.S. Cl.
CPC ............. *H01G 11/24* (2013.01); *H01G 11/06* (2013.01); *H01G 11/34* (2013.01); *H01G 11/36* (2013.01);
(Continued)

(58) Field of Classification Search
CPC ........ H01G 11/24; H01G 11/36; H01G 11/34; H01G 11/86
(Continued)

(56) References Cited

U.S. PATENT DOCUMENTS

| 2011/0013344 A1 | 1/2011 | Remizov et al. |
| 2011/0165321 A1 | 7/2011 | Zhamu et al. |

(Continued)

FOREIGN PATENT DOCUMENTS

| CN | 2588551 Y | 11/2003 |
| CN | 102683035 A | 9/2012 |

(Continued)

OTHER PUBLICATIONS

Tae Young Kim et al., High-Performance Supercapacitors Based on Poly(ionic liquid)-Modified Graphene Electrodes, ACS Nano, Dec. 13, 2010, vol. 5, pp. 1-10.

*Primary Examiner* — Eric Thomas
*Assistant Examiner* — Arun Ramaswamy
(74) *Attorney, Agent, or Firm* — Drinker Biddle & Reath LLP

(57) ABSTRACT

An electrode for a power storage device includes carbon nanotubes, graphene, an ionic liquid, and a three-dimensional network metal porous body which holds the carbon nanotubes, the graphene, and the ionic liquid in pore por- (Continued)

tions, wherein a ratio of a total amount of the carbon nanotubes and the graphene to an amount of the ionic liquid is more than or equal to 10% by mass and less than or equal to 90% by mass, and a mass ratio between the carbon nanotubes and the graphene is within a range of 3:7 to 7:3.

9 Claims, 2 Drawing Sheets

(51) Int. Cl.
- *H01G 11/34* (2013.01)
- *H01G 11/36* (2013.01)
- *H01G 11/86* (2013.01)
- *B05D 5/12* (2006.01)
- *H01M 4/02* (2006.01)
- *H01G 11/06* (2013.01)
- *H01M 4/133* (2010.01)
- *H01M 4/1393* (2010.01)
- *H01G 11/38* (2013.01)

(52) U.S. Cl.
CPC ............ *H01G 11/38* (2013.01); *H01G 11/86* (2013.01); *H01M 4/133* (2013.01); *H01M 4/1393* (2013.01); *H01M 2004/021* (2013.01); *Y02E 60/13* (2013.01)

(58) Field of Classification Search
USPC .......................... 361/502; 427/79; 429/209
See application file for complete search history.

(56) References Cited

U.S. PATENT DOCUMENTS

| | | |
|---|---|---|
| 2012/0256138 A1 | 10/2012 | Suh et al. |
| 2012/0261612 A1 | 10/2012 | Suh et al. |
| 2012/0328946 A1 | 12/2012 | Bosnyak et al. |
| 2013/0065034 A1 | 3/2013 | Muramatsu |
| 2013/0176659 A1 | 7/2013 | Hata et al. |
| 2013/0252499 A1 | 9/2013 | Zhou et al. |

FOREIGN PATENT DOCUMENTS

| | | |
|---|---|---|
| CN | 102763251 A | 10/2012 |
| CN | 102906015 A | 1/2013 |
| CN | 103003904 A | 3/2013 |
| JP | 2005-079505 A | 3/2005 |
| JP | 2009-267340 A | 11/2009 |
| JP | 2010-205695 A | 9/2010 |
| JP | 2011-249673 A | 12/2011 |
| WO | WO-2011/078585 A2 | 6/2011 |
| WO | WO-2012/088697 A1 | 7/2012 |
| WO | WO-2012/108371 A1 | 8/2012 |

ELECTRODE FOR POWER STORAGE DEVICE, POWER STORAGE DEVICE, AND METHOD FOR MANUFACTURING ELECTRODE FOR POWER STORAGE DEVICE

TECHNICAL FIELD

The present invention relates to an electrode for a power storage device, a power storage device, and a method for manufacturing an electrode for a power storage device.

BACKGROUND ART

Of power storage devices, capacitors are widely used for various kinds of electric apparatuses and the like. Among capacitors of many types, an electric double layer capacitor and a lithium ion capacitor have large capacities, and are particularly attracting attention in recent years.

An electric double layer capacitor is a power storage device including a cell, a sealed container for securing electric insulation between cells and preventing liquid leakage, a power collecting electrode for taking out electricity, and a lead wire. Said cell mainly includes a pair of activated carbon electrodes facing each other, a separator for electrically separating them, and an organic electrolytic solution for exhibiting capacity.

Further, a lithium ion capacitor is a power storage device in which an electrode which can electrostatically adsorb and desorb ions, such as an activated carbon electrode, is used as a positive electrode, and an electrode which can occlude lithium ions, such as hard carbon, is used as an negative electrode.

Energy stored in an electric double layer capacitor is expressed by the following equation (1):

$$W=(1/2)CU^2 \quad (1),$$

where W indicates stored energy (capacity), C indicates electrostatic capacitance (dependent on the surface area of an electrode), and U indicates cell voltage.

From the above equation (1), it is conceivable that improvement in electrostatic capacitance contributes to improvement in stored energy.

Japanese Patent Laying-Open No. 2005-079505 (PTD 1) discloses an "electrode material for an electric double layer capacitor, characterized by being made of a gel composition including: carbon nanotubes obtained by applying a shear force to the carbon nanotubes and subdividing the carbon nanotubes in the presence of an ionic liquid; and the ionic liquid", to improve electrostatic capacitance in the electric double layer capacitor.

Japanese Patent Laying-Open No. 2009-267340 (PTD 2) discloses an "electrode for an electric double layer capacitor, characterized in that a sheet prepared by molding carbon nanotubes with a specific surface area of 600 to 2600 m²/g in the shape of paper is integrated with a base material which constitutes a power collector and has an irregular portion in its surface, through the irregular portion".

CITATION LIST

Patent Document

PTD 1: Japanese Patent Laying-Open No. 2005-079505
PTD 2: Japanese Patent Laying-Open No. 2009-267340

SUMMARY OF INVENTION

Technical Problem

However, the gel composition described in Japanese Patent Laying-Open No. 2005-079505 (PTD 1) is easy to deform and is not solidified, and thus it is inconvenient to handle the gel composition as an electrode material. Moreover, it is difficult to thickly mount the gel composition on a power collecting foil, and thus there is also a problem in increasing electrostatic capacitance per unit area of the electrode.

Further, although Japanese Patent Laying-Open No. 2009-267340 (PTD 2) also describes a technique which uses foamed nickel (a three-dimensional network nickel porous body) as a base material, there is a problem that it is difficult to uniformly disperse carbon nanotubes over the base material having the irregular portion. Furthermore, gas such as CO is generated due to residual moisture and a functional group in activated carbon, and there is also a problem in increasing cell voltage. In addition, it is also desired to increase an output, in connection with the contact property between the electrode material and the power collector.

The present invention has been made in view of the aforementioned problems, and one object of the present invention is to provide: an electrode for a power storage device which can improve electrostatic capacitance and cell voltage and can improve stored energy density when used as an electrode for a power storage device, and which can additionally improve rate characteristic; a power storage device using the electrode for the power storage device; and a method for manufacturing the electrode for the power storage device.

Solution to Problem

The present invention is directed to an electrode for a power storage device, including carbon nanotubes, graphene, an ionic liquid, and a three-dimensional network metal porous body which holds the carbon nanotubes, the graphene, and the ionic liquid in pore portions, wherein a ratio of a total amount of the carbon nanotubes and the graphene to an amount of the ionic liquid is more than or equal to 10% by mass and less than or equal to 90% by mass, and a mass ratio between the carbon nanotubes and the graphene is within a range of 3:7 to 7:3.

Preferably, in the electrode for the power storage device in accordance with the present invention, the graphene has an average thickness in a range of more than or equal to 0.34 nm and less than or equal to 100 nm.

Preferably, in the electrode for the power storage device in accordance with the present invention, the carbon nanotubes each have a shape in which both ends are opened.

Preferably, in the electrode for the power storage device in accordance with the present invention, the carbon nanotubes have an average length in a range of more than or equal to 100 nm and less than or equal to 2000 µm.

Preferably, in the electrode for the power storage device in accordance with the present invention, the carbon nanotubes have an average diameter in a range of more than or equal to 0.5 nm and less than or equal to 50 nm.

Preferably, in the electrode for the power storage device in accordance with the present invention, the carbon nanotubes have a purity of more than or equal to 70% by mass.

The present invention is directed to a power storage device including the electrode for the power storage device in accordance with the present invention. Preferably, in the power storage device in accordance with the present invention, the power storage device is an electric double layer capacitor.

The present invention is directed to a method for manufacturing the electrode for the power storage device in accordance with the present invention, including the steps of kneading carbon nanotubes and graphene into an ionic liquid to produce a kneaded material, and charging the kneaded material into pore portions of a three-dimensional network metal porous body.

Advantageous Effects of Invention

The present invention can provide: an electrode for a power storage device which can improve electrostatic capacitance and cell voltage and can improve stored energy density when used as an electrode for a power storage device, and which can additionally improve rate characteristic; a power storage device using the electrode for the power storage device; and a method for manufacturing the electrode for the power storage device.

DESCRIPTION OF EMBODIMENTS

Figure 1:
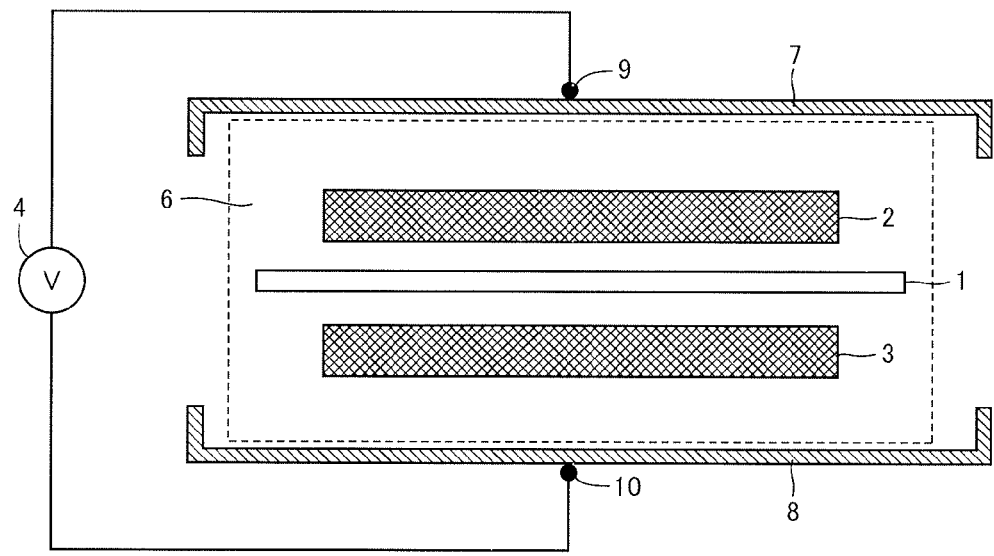
FIG. 1 is a schematic view of a cell of an electric double layer capacitor in one embodiment of the present invention.

[Description of Embodiments of Invention of Present Application]

First, the contents of embodiments of the invention of the present application will be described in list form.

One embodiment of the present invention is directed to an electrode for a power storage device, including carbon nanotubes, graphene, an ionic liquid, and a three-dimensional network metal porous body which holds the carbon nanotubes, the graphene, and the ionic liquid in pore portions, wherein a ratio of a total amount of the carbon nanotubes and the graphene to an amount of the ionic liquid is more than or equal to 10% by mass and less than or equal to 90% by mass, and a mass ratio between the carbon nanotubes and the graphene is within a range of 3:7 to 7:3.

When the electrode for the power storage device in one embodiment of the present invention is used as an electrode for a power storage device, the electrode can improve the electrostatic capacitance and cell voltage of the power storage device, and can improve stored energy density. In addition, the electrode can improve the rate characteristic of the power storage device.

Preferably, in the electrode for the power storage device in one embodiment of the present invention, the graphene has an average thickness in a range of more than or equal to 0.34 nm and less than or equal to 100 nm. More preferably, the graphene has an average thickness in a range of more than or equal to 0.34 nm and less than or equal to 5 nm.

When the average thickness of the graphene is in the range of more than or equal to 0.34 nm and less than or equal to 100 nm, bucky gel (a black gel-like material) can be formed in a case where the graphene is mixed with the ionic liquid. Since the bucky gel has a moderate viscosity, it is satisfactorily held in the pore portions of the three-dimensional network metal porous body. Therefore, according to one embodiment of the present invention, the graphene is satisfactorily held in the pore portions of the three-dimensional network metal porous body.

Preferably, in the electrode for the power storage device in one embodiment of the present invention, the graphene has an average particle size in a range of more than or equal to 0.1 nm and less than or equal to 4 μm.

When the average particle size of the graphene is in the range of more than or equal to 0.1 nm and less than or equal to 4 μm, bucky gel (a black gel-like material) can be formed in a case where the graphene is mixed with the ionic liquid. Therefore, according to one embodiment of the present invention, the graphene is satisfactorily held in the pore portions of the three-dimensional network metal porous body.

Preferably, in the electrode for the power storage device in one embodiment of the present invention, the carbon nanotubes each have a shape in which both ends are opened.

When the both ends of the carbon nanotube are opened, the ionic liquid and an electrolytic solution can easily enter the inside of the carbon nanotube, and thus the contact area between the carbon nanotube and the ionic liquid and the electrolytic solution is increased. Accordingly, the electrode for the power storage device in accordance with the present invention can increase the electrostatic capacitance of the power storage device.

Preferably, in the electrode for the power storage device in one embodiment of the present invention, the carbon nanotubes have an average length in a range of more than or equal to 100 nm and less than or equal to 2000 μm. More preferably, the carbon nanotubes have an average length in a range of more than or equal to 500 nm and less than or equal to 100 μm.

When the average length of the carbon nanotubes is in the range of more than or equal to 100 nm and less than or equal to 2000 μm, and more preferably in the range of more than or equal to 500 nm and less than or equal to 100 μm, the carbon nanotubes disperse satisfactorily in the ionic liquid, and the carbon nanotubes can be easily held in pores of the three-dimensional network metal porous body. Accordingly, the contact area between the carbon nanotubes and the ionic liquid is increased, and the electrostatic capacitance of the power storage device can be increased.

Preferably, in the electrode for the power storage device in one embodiment of the present invention, the carbon nanotubes have an average diameter in a range of more than or equal to 0.5 nm and less than or equal to 50 nm.

When the average diameter of the carbon nanotubes is in the range of more than or equal to 0.5 nm and less than or equal to 50 nm, the ionic liquid and the electrolytic solution can easily enter the inside of the carbon nanotubes, and thus the contact area between the carbon nanotubes and the ionic liquid and the electrolytic solution is increased. Accordingly, the electrostatic capacitance of the power storage device can be increased.

Preferably, in the electrode for the power storage device in one embodiment of the present invention, the carbon nanotubes have a purity of more than or equal to 70% by mass. More preferably, the carbon nanotubes have a purity of more than or equal to 90% by mass.

When the purity of the carbon nanotubes is less than 70% by mass, there are concerns about the reduction of a breakdown voltage and the generation of a dendrite due to the influence of a catalytic metal. Further, when the purity of the carbon nanotubes is more than or equal to 90% by mass, a good electrical conductivity can be achieved. Accordingly, the electrode for the power storage device in accordance with the present invention can improve an output of the power storage device.

One embodiment of the present invention is directed to a power storage device including the electrode for the power storage device in accordance with the present invention. According to the power storage device in accordance with the present invention, electrostatic capacitance and cell voltage can be improved, and stored energy density can be improved.

Preferably, in the power storage device in one embodiment of the present invention, the power storage device is an electric double layer capacitor.

When the electrode for the power storage device in accordance with the present invention is used as an electrode for an electric double layer capacitor, the electrode can improve the electrostatic capacitance and cell voltage of the capacitor, and can improve stored energy density.

One embodiment of the present invention is directed to a method for manufacturing the electrode for the power storage device in accordance with the present invention, including the steps of kneading carbon nanotubes and graphene into an ionic liquid to produce a kneaded material, and charging the kneaded material into pore portions of a three-dimensional network metal porous body.

According to the present invention, an electrode for a power storage device in which a kneaded material containing carbon nanotubes, graphene, and an ionic liquid is charged in pores of a three-dimensional network metal porous body can be obtained. When the electrode for the power storage device is used as an electrode for a power storage device, the electrode can improve the electrostatic capacitance and cell voltage of the power storage device, and can improve stored energy density. In addition, the electrode can improve the rate characteristic of the power storage device.

Hereinafter, the present invention will be described based on embodiments. It should be noted that the present invention is not limited to the embodiments described below. Various modifications can be made to the embodiments described below within the scope identical and equivalent to the scope of the present invention.

First Embodiment: Electrode for Power Storage Device

In one embodiment of the present invention, an electrode for a power storage device includes carbon nanotubes, graphene, an ionic liquid, and a three-dimensional network metal porous body which holds the carbon nanotubes, the graphene, and the ionic liquid in pore portions, wherein a ratio of a total amount of the carbon nanotubes and the graphene to an amount of the ionic liquid is more than or equal to 10% by mass and less than or equal to 90% by mass, and a mass ratio between the carbon nanotubes and the graphene is within a range of 3:7 to 7:3.

(Carbon Nanotube)

Since a carbon nanotube is fibrous, when carbon nanotubes are included as an active material, the contact property in the active material is improved and the electrical conductivity of the active material is improved. Thus, when an electrode including carbon nanotubes as an active material is used as an electrode for a power storage device, the electrode can improve the output of the power storage device.

Examples of a carbon nanotube that can be used include a single-layer carbon nanotube (hereinafter also referred to as a single-layer CNT) in which only a single carbon layer (graphene) has a cylindrical shape, a double-layer carbon nanotube (hereinafter also referred to as a double-layer CNT) or a multilayer carbon nanotube (hereinafter also referred to as a multilayer CNT) in which a stacked body of a plurality of carbon layers has a cylindrical shape, a cup stack-type nanotube having a structure in which graphenes in the shape of a bottomless paper cup are stacked, and the like.

The shape of a carbon nanotube is not particularly limited, and both a carbon nanotube having a closed end and a carbon nanotube having an opened end can be used. Above all, it is preferable to use a carbon nanotube having a shape in which both ends are opened. When the both ends of the carbon nanotube are opened, the ionic liquid and an electrolytic solution can easily enter the inside of the carbon nanotube, and thus the contact area between the carbon nanotube and the ionic liquid and the electrolytic solution is increased. Accordingly, an electrode for a power storage device using the carbon nanotubes can increase the electrostatic capacitance of the power storage device.

The average length of the carbon nanotubes is preferably in a range of more than or equal to 100 nm and less than or equal to 2000 μm, and further preferably in a range of more than or equal to 500 nm and less than or equal to 100 μm. When the average length of the carbon nanotubes is in the range of more than or equal to 100 nm and less than or equal to 2000 μm, the carbon nanotubes disperse satisfactorily in the ionic liquid, and the carbon nanotubes can be easily held in pores of the three-dimensional network metal porous body. Accordingly, the contact area between the carbon nanotubes and the ionic liquid is increased, and the electrostatic capacitance of the power storage device can be increased. Further, when the average length of the carbon nanotubes is more than or equal to 500 nm and less than or equal to 100 μm, the effect of increasing the electrostatic capacitance of the power storage device is significant.

The average diameter of the carbon nanotubes is preferably in a range of more than or equal to 0.5 nm and less than or equal to 50 nm, and further preferably in a range of more than or equal to 0.5 nm and less than or equal to 5 nm. When the average diameter of the carbon nanotubes is in the range of more than or equal to 0.5 nm and less than or equal to 50 nm, the ionic liquid and the electrolytic solution can easily enter the inside of the carbon nanotubes, and thus the contact area between the carbon nanotubes and the ionic liquid and the electrolytic solution is increased, and the electrostatic capacitance of the power storage device can be increased.

The purity of the carbon nanotubes is preferably more than or equal to 70% by mass, and further preferably more than or equal to 90% by mass. When the purity of the carbon nanotubes is less than 70% by mass, there are concerns about the reduction of a breakdown voltage and the generation of a dendrite due to the influence of a catalytic metal.

When the purity of the carbon nanotubes is more than or equal to 90% by mass, a good electrical conductivity can be achieved. Accordingly, the electrode for the power storage device fabricated using the carbon nanotubes can improve the output of the power storage device.

(Graphene)

When carbon atoms are chemically bonded by sp2 hybrid orbital, the carbon atoms form a two-dimensional network structure film in which six-membered carbon rings are arranged in a plane. This two-dimensional planar structure of carbon atoms is called graphene.

As the graphene, it is preferable to use powdered graphene having a layer structure in which a plurality of graphene sheets are stacked in a normal direction.

The average thickness of the powdered graphene is preferably in a range of more than or equal to 0.34 nm and less than or equal to 100 nm, and more preferably in a range of more than or equal to 0.34 nm and less than or equal to 5 nm. Here, the average thickness is a value measured with a transmission electron microscope (TEM).

When the average thickness of the graphene is in the range of more than or equal to 0.34 nm and less than or equal to 100 nm, bucky gel (a black gel-like material) can be formed in a case where the graphene is mixed with the ionic liquid. Since the bucky gel has a moderate viscosity, it is satisfactorily held in the pore portions of the three-dimensional network metal porous body. Therefore, according to one embodiment of the present invention, the graphene is satisfactorily held in the pore portions of the three-dimensional network metal porous body.

The average particle size of the powdered graphene is preferably in a range of more than or equal to 0.1 nm and less than or equal to 4 µm. Here, the average particle size is a value measured with a transmission electron microscope (TEM) or an optical particle-size-distribution measuring instrument.

When the average particle size of the graphene is in the range of more than or equal to 0.1 nm and less than or equal to 4 µm, bucky gel (a black gel-like material) can be formed in a case where the graphene is mixed with the ionic liquid. Therefore, according to one embodiment of the present invention, the graphene is satisfactorily held in the pore portions of the three-dimensional network metal porous body.

The surface area of the powdered graphene is preferably in a range of more than or equal to 100 $m^2/g$ and less than or equal to 2600 $m^2/g$. Here, the surface area is a value measured with a surface area measuring instrument (BET method).

When the surface area of the powdered graphene is in the range of more than or equal to 100 $m^2/g$ and less than or equal to 2600 $m^2/g$, the contact area between the powdered graphene and the ionic liquid and the electrolytic solution is increased, and thus the electrostatic capacitance of the power storage device can be increased.

The carbon content of the powdered graphene is preferably more than or equal to 98% by mass. Here, the carbon content is a value measured by X-ray photoelectron spectrometry.

When the carbon content of the powdered graphene is more than or equal to 98% by mass, a good electrical conductivity can be achieved. Accordingly, the electrode for the power storage device in accordance with the present invention can improve the output of the power storage device.

(Ionic Liquid)

An ionic liquid is prepared by combining an anion and a cation to have a melting point of about 100° C. or less. Examples of the anion that can be used include hexafluorophosphate ($PF_6$), tetrafluoroborate ($BF_4$), bis(trifluoromethanesulfonyl)imide (TFSI), trifluoromethanesulfonate (TFS), and bis(perfluoroethylsulfonyl)imide (BETI). Examples of the cation that can be used include an imidazolium ion having an alkyl group of a carbon number of 1 to 8, a pyridinium ion having an alkyl group of a carbon number of 1 to 8, a piperidinium ion having an alkyl group of a carbon number of 1 to 8, a pyrrolidinium ion having an alkyl group of a carbon number of 1 to 8, and a sulfonium ion having an alkyl group of a carbon number of 1 to 8.

Examples of the ionic liquid that can be used include 1-ethyl-3-methylimidazolium tetrafluoroborate (EMI-$BF_4$), 1-ethyl-3-methylimidazolium-bis(fluorosulfonyl)imide (EMI-FSI), 1-ethyl-3-methylimidazolium-bis(trifluoromethanesulfonyl)imide (EMI-TFSI), 1-butyl-3-methyl-imidazolium-bis(trifluoromethanesulfonyl)imide (BMI-TFSI), 1-hexyl-3-methylimidazolium tetrafluoroborate (HMI-$BF_4$), 1-hexyl-3-methylimidazolium-bis(trifluoromethanesulfonyl)imide (HMI-TFSI), 1-ethyl-3-methyl-imidazolium-fluorohydrogenate (EMI $(FH)_{2.3}F$), N,N-diethyl-N-methyl-N-(2-methoxyethyl)-tetrafluoroborate (DEME-$BF_4$), N,N-diethyl-N-methyl-N-(2-methoxyethyl)-bis(trifluoromethanesulfonyl)imide (DEME-TESI), N-methyl-N-propylpiperidinium bis(trifluoromethanesulfonyl)imide (PP13-TFSI), triethyl sulfonium-bis(trifluoromethanesulfonyl)imide (TES-TFSI), N-methyl-N-propylpyrrolidinium-bis(trifluoromethanesulfonyl)imide (P13-TFSI), triethyloctyl phosphonium-bis(trifluoromethanesulfonyl)imide (P2228-TFSI), and N-methyl-methoxymethylpyrrolidinium-tetrafluoroborate (C13-$BF_4$). Further, these ionic liquids may be used alone or can also be used in combination as appropriate. Furthermore, the ionic liquid may also contain a supporting salt.

When the electrode for the power storage device is used for a lithium ion capacitor, for example, an ionic liquid containing a lithium salt such as lithium-bis(fluorosulfonyl)imide (LiFSI) or lithium-bis(trifluoromethanesulfonyl)imide (LiTFSI) is used as the ionic liquid.

When the electrode for the power storage device is used for a lithium ion capacitor, a solution in which a supporting salt is dissolved in the ionic liquid is used.

Examples of the supporting salt that can be used include lithium-hexafluorophosphate ($LiPF_6$), lithium-tetrafluoroborate ($LiBF_4$), lithium-perchlorate ($LiClO_4$), lithium-bis(trifluoromethanesulfonyl)imide ($LiN(SO_2CF_3)_2$), lithium-bis(pentafluoroethanesulfonyl)imide ($LiN(SO_2C_2F_5)_2$), lithium-bis(pentafluoroethanesulfonyl)imide (LiBETI), lithium-trifluoromethanesulfonate ($LiCF_3SO_3$), lithium-bis(oxalate)borate ($LiBC_4O_5$), and the like.

The concentration of the supporting salt in the ionic liquid is preferably more than or equal to 0.1 mol/L and less than or equal to 5.0 mol/L, and more preferably more than or equal to 1 mol/L and less than or equal to 3.0 mol/L.

The ionic liquid can contain an organic solvent. When the ionic liquid contains an organic solvent, the viscosity of the ionic liquid is reduced. Accordingly, the electrode for the power storage device in which the ionic liquid contains an organic solvent can improve the low-temperature characteristics of the power storage device.

As the organic solvent, for example, propylene carbonate (PC), dimethyl carbonate (DMC), diethyl carbonate (DEC), ethyl methyl carbonate (EMC), γ-butyrolactone (GBL), acetonitrile (AN), and the like can be used alone or in combination.

(Three-Dimensional Network Metal Porous Body)

The three-dimensional network metal porous body serves as a power collector in the electrode for the power storage device.

The three-dimensional network metal porous body has a three-dimensional network structure having a connected porous shape. The three-dimensional network metal porous body can be made of for example, a metal nonwoven fabric entangled with fibrous metal, a metal foam formed by foaming a metal, Celmet (registered trademark) (manufactured by Sumitomo Electric Industries, Ltd.), which is fabricated by forming a metal layer on a surface of a foamed resin and then decomposing the foamed resin, or the like.

As the metal of the three-dimensional network metal porous body, it is preferable to use aluminum, nickel, copper, an aluminum alloy, or a nickel alloy. Since these metals or metal alloys are less likely to elute even in a used voltage range of the power storage device (more than or equal to about 0 V and less than or equal to about 5 V with respect to the potential of lithium), a power storage device in which stable charging can be performed even in long-term charging and discharging can be obtained. In particular in a high voltage range (more than or equal to 3.5 V with respect to the potential of lithium), it is preferable that the metal of the three-dimensional network metal porous body includes aluminum, an aluminum alloy, or a nickel alloy, and it is further preferable that the metal of the three-dimensional network metal porous body is aluminum.

Preferably, the three-dimensional network metal porous body has an average pore diameter of more than or equal to 50 μm and less than or equal to 1000 μm. When the average pore diameter of the three-dimensional network metal porous body is more than or equal to 50 μm, the carbon nanotubes, the graphene, and the ionic liquid can easily enter the pores of the three-dimensional network metal porous body, and a good contact property can be achieved between both of the carbon nanotubes and the graphene and the three-dimensional network metal porous body. Accordingly, the internal resistance of the electrode is reduced, and the energy density of the power storage device can be improved. On the other hand, when the average pore diameter of the three-dimensional network metal porous body is less than or equal to 1000 μm, an active material can be satisfactorily held in the pores without using a binder component, and a capacitor having a further sufficient strength can be obtained. The pore diameter of the three-dimensional network metal porous body is more preferably more than or equal to 400 μm and less than or equal to 900 μm, and particularly preferably more than or equal to 450 μm and less than or equal to 850 μm.

It should be noted that the average pore diameter of the three-dimensional network metal porous body can be confirmed by shaving the surface of the electrode for the power storage device to such an extent that the skeleton of the metal porous body can be observed, then observing the pore diameter of the metal porous body exposed at the surface with a microscope.

The basis weight of the three-dimensional network metal porous body is preferably less than or equal to 500 g/m$^2$, from the viewpoints of the strength as an electrode for a power storage device, and of reducing the electric resistance of the power storage device. Further, the basis weight of the three-dimensional network metal porous body is preferably less than or equal to 150 g/m$^2$, from the viewpoint of improving the energy density of the power storage device.

Although the porosity occupied by the volume of the internal space of the three-dimensional network metal porous body is not particularly limited, it is preferably about 80% to 98%.

(Binder)

A binder has a role to bind a power collector and an active material in an electrode. However, since a binder resin represented by polyvinylidene fluoride (PVdF) is an insulator, the binder resin itself becomes a factor which increases the internal resistance of a power storage device including an electrode, and thus becomes a factor which reduces the efficiency of charging and discharging the power storage device.

According to the electrode for the power storage device in one embodiment of the present invention, the electrode can hold the active material in the pores of the three-dimensional network metal porous body which is a power collector, without using a binder. Thus, the electrode can be fabricated without using a binder component which is an insulator. Accordingly, since the electrode for the power storage device can be provided with the active material with a high content in unit volume of the electrode, and also has a reduced internal resistance, it can improve the electrostatic capacitance and cell voltage of the power storage device and can improve stored energy density. Therefore, it is preferable in one embodiment of the present invention that the electrode for the power storage device does not contain a binder.

It should be noted that, in other embodiments of the present invention, the electrode for the power storage device can also use a binder. Examples of the binder that can be used include polyvinylidene fluoride-hexafluoropropylene copolymer (PVdF-HFP), polyethylene oxide modified polymethacrylate crosslinked body (PEO-PMA), polyethylene oxide (PEO), polyethylene glycol diacrylate crosslinked body (PEO-PA), polyacrylonitrile (PAN), polymethylmethacrylate (PMMA), polyvinyl alcohol (PVA), polyvinyl pyrrolidone (PVP), polyacrylic acid (PAA), polyvinyl acetate, pyridinium-1,4-diyliminocarbonyl-1,4-phenylenemethylene (PICPM)-BF$_4$, PICPM-PF$_6$, PICPM-TESA, PICPM-SCN, PICPM-OTf, alginic acid, chitosan, and the like. Of them, polyvinylidene fluoride-hexafluoropropylene copolymer (PVdF-HFP), polymethylmethacrylate (PMMA), or polyethylene oxide modified polymethacrylate crosslinked body (PEO-PMA) is preferably used.

(Conductive Assistant)

The electrode for the power storage device may contain a conductive assistant. The conductive assistant can reduce the resistance of the power storage device. The type of the conductive assistant is not particularly limited, and for example, acetylene black, Ketjen black, carbon fiber, natural graphite (such as scaly graphite, earthy graphite), artificial graphite, or the like can be used. The content of the conductive assistant is preferably more than or equal to 2 parts by mass and less than or equal to 20 parts by mass with respect to 100 parts by mass of the active material, for example. When the content is less than 2 parts by mass, the effect of improving conductivity is reduced, and when the content is more than 20 parts by mass, electrostatic capacitance may be reduced.

(Method for Manufacturing Electrode for Power Storage Device)

Hereinafter, a method for manufacturing the electrode for the power storage device in one embodiment of the present invention will be described.

First, the carbon nanotubes, the graphene, and the ionic liquid are kneaded to obtain a kneaded material. For example, a kneaded material in which the carbon nanotubes and the graphene are dispersed uniformly in the ionic liquid can be obtained by kneading them for more than or equal to 10 minutes and less than or equal to about 120 minutes, using a mortar. Dispersion of the carbon nanotubes and the graphene in the ionic liquid eliminates aggregation of the nanocarbon-based active materials, and increases the specific surface area of the active materials. Thus, when an electrode is fabricated using the kneaded material, a larger electrostatic capacitance can be obtained.

The kneading ratio between both of the carbon nanotubes and the graphene and the ionic liquid is adjusted such that the ratio of the total amount of the carbon nanotubes and the graphene to the amount of the ionic liquid is more than or equal to 10% by mass and less than or equal to 90% by mass, preferably more than or equal to 10% by mass and less than or equal to 60% by mass. When the ratio of the total amount of the carbon nanotubes and the graphene to the amount of the ionic liquid is more than or equal to 10% by mass and less than or equal to 60% by mass, such a kneaded material is easily charged into the three-dimensional network metal porous body, and thus is preferable.

Further, the above kneading ratio is adjusted such that the mass ratio between the carbon nanotubes and the graphene is within a range of 3:7 to 7:3. When the mass ratio between the carbon nanotubes and the graphene is within the range of 3:7 to 7:3, the obtained power storage device can improve the rate characteristic of the power storage device.

It should be noted that, in a case where a supporting salt or a binder is added, it can be added in the kneading step.

Next, the kneaded material is charged into the three-dimensional network metal porous body. For example, the three-dimensional network metal porous body is placed on a mesh or a porous plate or film having air permeability or liquid permeability, and the kneaded material is charged from an upper surface of the three-dimensional network metal porous body toward a lower surface (surface placed on the mesh or the plate) thereof, to be rubbed into the pores using a squeegee or the like.

The thickness of the electrode can be adjusted by any of (1) a method of adjusting the thickness of the three-dimensional network metal porous body beforehand, and (2) a method of adjusting the thickness of the three-dimensional network metal porous body after charging the kneaded material into the three-dimensional network metal porous body.

In the method (1), for example, the thickness of the three-dimensional network metal porous body, which is more than or equal to 50 µm and less than or equal to 3 mm, is adjusted to an optimum thickness by a roll press. The thickness of the three-dimensional network metal porous body is preferably more than or equal to 50 µm and less than or equal to 800 µm, for example.

In the method (2), for example, after the kneaded material is charged into the three-dimensional network metal porous body, ionic liquid absorbers are placed on both sides of the three-dimensional network metal porous body, and thereafter the three-dimensional network metal porous body is uniaxially rolled in the thickness direction by applying a pressure of about 30 MPa to 450 MPa. During rolling, an excessive ionic liquid is drained from the kneaded material charged in the three-dimensional network metal porous body, and is absorbed into the ionic liquid absorbers. Accordingly, the concentration of the active material in the kneaded material remaining in the three-dimensional network metal porous body is increased. Thus, in the power storage device using the electrode, the discharging capacity per unit area of the electrode (mAh/cm$^2$) and the output per unit area of the electrode (W/cm$^2$) can be increased.

The thickness of the electrode is preferably set to be in a range of more than or equal to 0.2 mm and less than or equal to 1.0 mm, from the viewpoint of the discharging capacity per unit area of the electrode. Further, the thickness of the electrode is preferably set to be in a range of more than or equal to 0.05 mm and less than or equal to 0.5 mm, from the viewpoint of the output per unit area of the electrode.

Although the physical properties and pore diameter of the ionic liquid absorber are not particularly limited, it is preferable to use an absorber subjected to hydrophilization treatment for a hydrophilic ionic liquid (for example, such as EMI-BF$_4$, DEME-BF$_4$, C13-BF$_4$), and to use an absorber subjected to hydrophobization treatment for a hydrophobic ionic liquid (for example, such as EMI-PSI, EMI-TFSI, DEME-TFSI, PPI3-TFSI, P13-TFSI, P2228-TFSI).

Second Embodiment: Electric Double Layer Capacitor

An electric double layer capacitor in one embodiment of the present invention will be described with reference to FIG. 1.

In the electric double layer capacitor using the electrode for the power storage device in accordance with the present invention, a positive electrode 2 and an negative electrode 3 are arranged with a separator 1 sandwiched therebetween. Separator 1, positive electrode 2, and negative electrode 3 are sealed in a space between an upper cell case 7 and a lower cell case 8 filled with an electrolytic solution 6. Terminals 9 and 10 are provided to upper cell case 7 and lower cell case 8, respectively. Terminals 9 and 10 are connected to a power source 4.

In the electric double layer capacitor, the electrode for the power storage device in accordance with the present invention can be used for the positive electrode and the negative electrode.

As the electrolytic solution, the ionic liquid used for the electrode for the power storage device can be used. As the separator for the electric double layer capacitor, a porous film having a high electrical insulation property made of, for example, polyolefin, polyethylene terephthalate, polyamide, polyimide, cellulose, glass fiber, or the like can be used.

(Method for Manufacturing Electric Double Layer Capacitor)

First, two electrodes are prepared by punching them from the electrode for the power storage device in accordance with the present invention so as to have an appropriate size, and are arranged to face each other with the separator sandwiched therebetween. Then, they are housed in a cell case, and are impregnated with the electrolytic solution. Finally, the case is covered with a lid and sealed, and thereby the electric double layer capacitor can be fabricated. In order to reduce the moisture within the capacitor limitlessly, fabrication of the capacitor is performed under an environment with little moisture, and sealing is performed under a reduced pressure environment. It should be noted that the electric double layer capacitor may be fabricated by any other method, as long as it uses the electrode for the power storage device in accordance with the present invention.

Third Embodiment: Lithium Ion Capacitor

Figure 2:
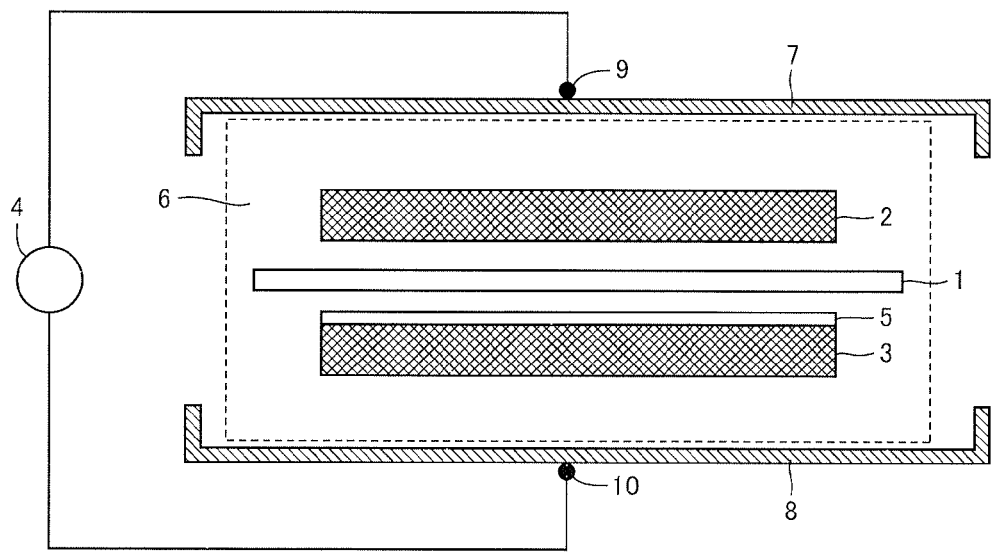
FIG. 2 is a schematic view of a cell of a lithium ion capacitor in one embodiment of the present invention.

A lithium ion capacitor in one embodiment of the present invention will be described with reference to FIG. 2.

The structure of the lithium ion capacitor using the electrode for the power storage device in accordance with the present invention is basically identical to the structure of the electric double layer capacitor, except that a lithium metal foil 5 is pressure-bonded on a surface of negative electrode 3 facing positive electrode 2.

In the lithium ion capacitor, the electrode for the power storage device in accordance with the present invention can be used for the positive electrode and the negative electrode. Further, the negative electrode is not particularly limited, and a conventional negative electrode using a metal foil can also be used.

As the electrolytic solution, the ionic liquid containing a lithium salt used for the electrode for the power storage device can be used. A lithium metal foil for lithium doping is pressure-bonded on the negative electrode.

In the lithium ion capacitor, it is preferable that the capacity of the negative electrode is larger than the capacity of the positive electrode, and the occlusion amount of lithium ions by the negative electrode is less than or equal to 90% of the difference between the capacity of the positive electrode and the capacity of the negative electrode. The occlusion amount of lithium ions can be adjusted by the thickness of the lithium metal foil pressure-bonded on the negative electrode.

(Method for Manufacturing Lithium Ion Capacitor)

First, positive and negative electrodes are prepared by punching them from the electrode for the power storage device in accordance with the present invention so as to have an appropriate size, and the lithium metal foil is pressure-bonded on the negative electrode. Next, the positive and negative electrodes are arranged to face each other with the separator sandwiched therebetween. On this occasion, the negative electrode is arranged such that its surface having the lithium metal foil pressure-bonded thereon faces the positive electrode. Then, they are housed in a cell case, and are impregnated with the electrolytic solution. Finally, the case is covered with a lid and sealed, and thereby the lithium ion capacitor can be fabricated.

It should be noted that, for lithium doping, the lithium ion capacitor is left at an environmental temperature of 0° C. to 60° C. for 0.5 hours to 100 hours, with the electrolytic solution being injected. When the potential difference between the positive and negative electrodes becomes less than or equal to 2 V, it can be determined that lithium doping is completed.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

Example 1

Manufacturing Examples 1 to 7

(Fabrication of Kneaded Material)

Graphene, carbon nanotubes, and an ionic liquid were prepared in accordance with each composition shown in Table 1, and these were kneaded for 30 minutes using a mortar to obtain a kneaded material.

(Fabrication of Electrode for Power Storage Device)

A three-dimensional network aluminum porous body (average pore diameter: 550 μm, thickness: 600 μm) was prepared. The kneaded material was placed on an upper surface of the three-dimensional network aluminum porous body, and was rubbed into the porous body using a squeegee, to fabricate an electrode for a power storage device.

(Fabrication of Electric Double Layer Capacitor)

From the obtained electrode for the power storage device, two electrodes were punched in the shape of a circle with a diameter of 6 mm, to constitute positive and negative electrodes. These electrodes were arranged to face each other with a cellulose fiber separator ("TF4050" manufactured by Nippon Kodoshi Corporation) sandwiched therebetween, and were housed in a coin cell case of type R2032. Next, EMI-BF$_4$ was injected as an electrolytic solution into the coin cell case, and then the case was sealed to fabricate a coin-type electric double layer capacitor.

Manufacturing Example 8

(Fabrication of Electrode)

Activated carbon from coconut husk (surface area: about 2000 m$^2$/g), carbon black (conductive assistant component), and polytetrafluoroethylene (binder component) were mixed at a ratio of 80% by mass, 10% by mass, and 10% by mass, respectively, and thereafter the mixture was rolled to obtain a 0.18 mm-thick activated carbon sheet electrode.

(Fabrication of Electric Double Layer Capacitor)

From the obtained electrode, two electrodes were punched in the shape of a circle with a diameter of 15 mm, and a 50 μm-thick aluminum power collecting foil was attached to one surface of the respective electrodes. Thereafter, a coin (R2032)-type electric double layer capacitor was obtained by the same method as that in Manufacturing Example 1. It should be noted that, as an electrolytic solution, a solution prepared by dissolving triethylmethyl ammonium tetrafluoroborate (TEMA-BF$_4$) salt in propylene carbonate (PC) at 1.0 mol/L was used.

<Performance Evaluation Test=

(Electrostatic Capacitance and Energy Density)

The electric double layer capacitor was charged to 3.5 V, using a constant current of 1 A/g (current amount per mass of active material contained in a single electrode), at an environmental temperature of 25° C., and then charging at a constant voltage of 3.5 V was performed for 5 minutes. Thereafter, the electric double layer capacitor was discharged to 0 V, using a constant current of 1 A/g (current amount per mass of active material contained in a single electrode), to evaluate electrostatic capacitance on that occasion. In Table 1, the electrostatic capacitance (F/g) is indicated as an electrostatic capacitance per mass of active material contained in a single electrode. Further, energy density WD (Wh/L) on that occasion is also indicated. The energy density was calculated using the following equation (2):

$$WD = W/V \qquad (2),$$

where W indicates energy stored in the capacitor, and V indicates volume. It should be noted that volume V is a capacitor volume without taking the coin cell case into consideration. Table 1 shows the results.

TABLE 1

|  |  | Manufacturing Examples | | | | | | | |
|---|---|---|---|---|---|---|---|---|---|
|  |  | 1 | 2 | 3 | 4 | 5 | 6 | 7 | 8 |
| Composition (parts by mass) | Graphene C$^{(Note\ 1)}$ | 5 | — | — | 6 | 4 | 7 | 3 | activated carbon sheet is used for electrode |
|  | Graphene M$^{(Note\ 2)}$ | — | 5 | — | — | — | — | — |  |
|  | Graphene H$^{(Note\ 3)}$ | — | — | 5 | — | — | — | — |  |
|  | Carbon Nanotube $^{(Note\ 4)}$ | 5 | 5 | 5 | 4 | 6 | 3 | 7 |  |
|  | Ionic Liquid$^{(Note\ 5)}$ | 100 | 100 | 100 | 100 | 100 | 100 | 100 |  |

TABLE 1-continued

|  |  | Manufacturing Examples | | | | | | | |
|---|---|---|---|---|---|---|---|---|---|
|  |  | 1 | 2 | 3 | 4 | 5 | 6 | 7 | 8 |
| Evaluation | Electrostatic Capacitance (F/g) | 60 | 57 | 55 | 55 | 58 | 52 | 60 | 35 |
|  | Energy Density (Wh/L) | 15.3 | 14.5 | 14.0 | 14.0 | 14.8 | 13.3 | 15.3 | 9.1 |
|  | Rate Characteristic (%) | 67 | 62 | 60 | 64 | 65 | 65 | 63 | 60 |

(Note 1)Graphene C: average thickness: 2 nm, average particle size: 1 to 2 μm
(Note 2)Graphene M: average thickness: 6 to 8 nm, average particle size: 5 μm
(Note 3)Graphene H: average thickness: 12 nm, average particle size: 5 μm
(Note 4) Carbon nanotube: single-layer carbon nanotube (purity: 97% by mass, average length: 5 μm, average diameter: 0.9 nm)
(Note 5)Ionic liquid: EMI-BF$_4$ (Rate Characteristic)

The electric double layer capacitor was charged to 3.5 V, using a constant current of 1 A/g (current amount per mass of active material contained in a single electrode), at an environmental temperature of 25° C., and then charging at a constant voltage of 3.5 V was performed for 5 minutes. Thereafter, the electric double layer capacitor was discharged to 0 V, using a constant current with a discharging current density of 1 mA/cm$^2$ or 60 mA/cm$^2$, to measure electrostatic capacitance (F/g) on that occasion. In Table 1, "rate characteristic" indicates a maintenance rate (%) of the electrostatic capacitance at the time of discharging at 60 mA/cm$^2$ with respect to the electrostatic capacitance at the time of discharging at 1 mA/cm$^2$, and is determined by the following equation:

$$(\text{Rate characteristic (\%)}) = (\text{electrostatic capacitance } (F/g) \text{ at time of discharging at 60 mA/cm}^2) / (\text{electrostatic capacitance } (F/g) \text{ at time of discharging at 1 mA/cm}^2 \text{ discharge}) \times 100.$$

Figure 3:
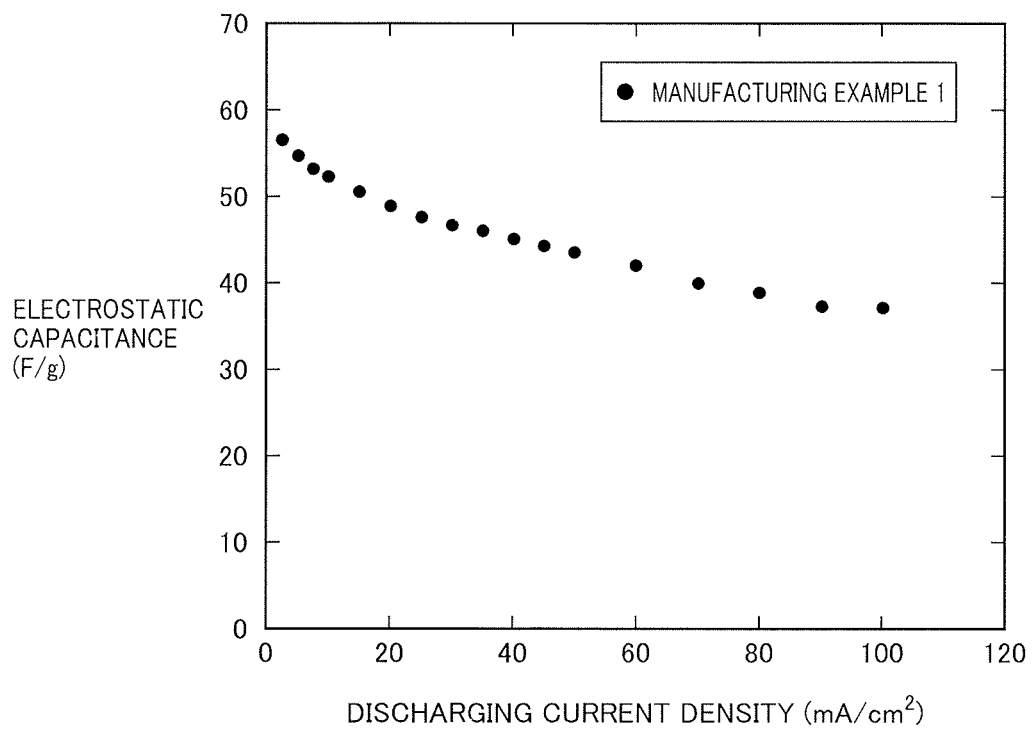
FIG. 3 is a view showing the relation (rate characteristic) between the discharging current density and the electrostatic capacitance of an electric double layer capacitor in Manufacturing Example 1.

Further, regarding Manufacturing Example 1, the electric double layer capacitor was charged and discharged as described above, with the discharging current density being changed in a range of 20 mA/cm$^2$ to 100 mA/cm$^2$, to evaluate electrostatic capacitance. FIG. 3 shows the result.

<Evaluation Results>

The electric double layer capacitors in Manufacturing Examples 1 to 7 had greater electrostatic capacitances and energy densities and equal or greater rate characteristics than those of the electric double layer capacitor in Manufacturing Example 8 using the activated carbon sheet electrode.

INDUSTRIAL APPLICABILITY

The power storage device using the electrode for the power storage device in accordance with the present invention can be used for various applications including, for example, transportation equipment such as a vehicle and a train.

REFERENCE SIGNS LIST

1: separator; 2: positive electrode; 3: negative electrode; 4: power source; 5: lithium metal foil; 6: electrolytic solution; 7: upper cell case; 8: lower cell case; 9, 10: terminal.

The invention claimed is:

1. An electrode for a power storage device, comprising:
   carbon nanotubes;
   graphene;
   an ionic liquid; and
   a three-dimensional network metal porous body which holds said carbon nanotubes, said graphene, and said ionic liquid in pore portions, wherein
   a ratio of a total amount of said carbon nanotubes and said graphene to an amount of said ionic liquid is more than or equal to 10% by mass and less than or equal to 90% by mass,
   a mass ratio between said carbon nanotubes and said graphene is within a range of 3:7 to 7:3,
   the pore diameter of the three-dimensional network metal porous body is more than or equal to 450 μm and less than or equal to 850 μm,
   the carbon nanotubes, the graphene, and the ionic liquid are placed into the three-dimensional network metal porous body as a kneaded material, and
   the electrode for the power storage device does not contain a binder.

2. The electrode for a power storage device according to claim 1, wherein said graphene has an average thickness in a range of more than or equal to 0.34 nm and less than or equal to 100 nm.

3. The electrode for a power storage device according to claim 1, wherein said carbon nanotubes each have a shape in which both ends are opened.

4. The electrode for a power storage device according to claim 1, wherein said carbon nanotubes have an average length in a range of more than or equal to 100 nm and less than or equal to 2000 μm.

5. The electrode for a power storage device according to claim 1, wherein said carbon nanotubes have an average diameter in a range of more than or equal to 0.5 nm and less than or equal to 50 nm.

6. The electrode for a power storage device according to claim 1, wherein said carbon nanotubes have a purity of more than or equal to 70% by mass.

7. A power storage device, comprising an electrode for a power storage device as recited in claim 1.

8. The power storage device according to claim 7, wherein said power storage device is an electric double layer capacitor.

9. A method for manufacturing an electrode for a power storage device as recited in claim 1, comprising the steps of:
   kneading carbon nanotubes and graphene into an ionic liquid to produce a kneaded material; and
   charging said kneaded material into pore portions of a three-dimensional network metal porous body, wherein the pore diameter of the three-dimensional network metal porous body is more than or equal to 450 μm and less than or equal to 850 μm, the carbon nanotubes, the graphene, and the ionic liquid are placed into the three-dimensional network metal porous body as a kneaded material, and the electrode for the power storage device does not contain a binder.

\* \* \* \* \*